(12) United States Patent
Ingham-Dempster

(10) Patent No.: US 9,241,173 B2
(45) Date of Patent: Jan. 19, 2016

(54) APPARATUS AND METHOD FOR COMPRESSION OF IMAGE DATA ASSEMBLES INTO GROUPS WITH POSITIONAL INDEXES

(71) Applicant: Tangentix Limited, Sheffield, South Yorkshire (GB)

(72) Inventor: Timothy Alexander Ingham-Dempster, Keighley (GB)

(73) Assignee: Tangentix Limited, Sheffield (GB)

( * ) Notice: Subject to any disclaimer, the term of this patent is extended or adjusted under 35 U.S.C. 154(b) by 147 days.

(21) Appl. No.: 14/067,062

(22) Filed: Oct. 30, 2013

(65) Prior Publication Data

US 2014/0119669 A1 May 1, 2014

(30) Foreign Application Priority Data

Oct. 31, 2012 (GB) .................................. 1219599.6
Aug. 27, 2013 (GB) .................................. 1315240.0

(51) Int. Cl.
| | |
|---|---|
| *G06K 9/46* | (2006.01) |
| *H04N 19/64* | (2014.01) |
| *H04N 19/129* | (2014.01) |
| *H04N 19/184* | (2014.01) |
| *H04N 19/34* | (2014.01) |

(52) U.S. Cl.
CPC ............ *H04N 19/64* (2014.11); *H04N 19/129* (2014.11); *H04N 19/184* (2014.11); *H04N 19/34* (2014.11)

(58) Field of Classification Search
None
See application file for complete search history.

(56) References Cited

U.S. PATENT DOCUMENTS

| | | | |
|---|---|---|---|
| 4,953,019 A | * 8/1990 | Skikakura et al. | ........ 375/240.03 |
| 2001/0013902 A1 | * 8/2001 | Kawabe | .................. 348/358 |
| 2005/0074177 A1 | 4/2005 | Ichimura et al. | |
| 2007/0071090 A1 | 3/2007 | Peng et al. | |
| 2010/0322597 A1 | 12/2010 | Gharavi-Alkhansari et al. | |
| 2012/0093429 A1 | 4/2012 | Van Der Vleuten et al. | |

FOREIGN PATENT DOCUMENTS

WO          9824188 A1      6/1998

OTHER PUBLICATIONS

Said, A. et al. "A New, Fast, and Efficient Image Codec Based on Set Partitioning in Hierarchical Trees." IEEE Transactions on Circuits and Systems for Video Technology, vol. 6, No. 3, Jun. 1996, pp. 243-250.

Oliver, J. "A New Fast Lower-Tree Wavelet Image Encoder." 2001 International Conference on Image Processing, 201, vol. 3, Oct. 7-10, 2001, pp. 780-783.

\* cited by examiner

*Primary Examiner* — Eueng-Nan Yeh
(74) *Attorney, Agent, or Firm* — Coats & Bennett, PLLC

(57) ABSTRACT

A data compression apparatus 100 and method suitable for image data 50 assembles pixel values 52 into at least one group 55 with a positional index 56. An encoding unit 130 sets a maximum bit plane according to a highest value in the group, and encodes the data values sequentially along the group using iteratively reduced bit plane levels until reaching a lowest bit plane or exhausting the data values in the group, including recording the positional index where the bit plane level is changed, to provide a compressed dataset.

16 Claims, 8 Drawing Sheets

APPARATUS AND METHOD FOR COMPRESSION OF IMAGE DATA ASSEMBLES INTO GROUPS WITH POSITIONAL INDEXES

RELATED CASES

This application claims the benefit of GB1219599.6 filed in United Kingdom on 31 Oct. 2012 and GB1315240.0 filed in United Kingdom on 27 Aug. 2013, the entire content of which is incorporated herein by reference.

BACKGROUND

1. Technical Field

The present invention relates generally to the field of compression algorithms for image data, and more particularly to a method and apparatus for compression of image data.

2. Description of Related Art

Many techniques for compression of image data are already known, such as JPEG (Joint Pictures Expert Group) and others. However, there is now a need for a compression algorithm with relatively low complexity and hence a relatively high speed. In particular, there is a need to compress large volumes of image data with relatively low processing overhead, while still achieving reasonably good compression ratios.

In the background art, image compression algorithms using ordered data sets or trees are well known, such as EZW (Embedded Zerotrees of Wavelet transforms) and SPIHT (SetPartitioning in Hierarchical Trees). However, an improved lossless-capable technique with high speed and a high compression ratio is still desired.

The example embodiments have been provided with a view to addressing at least some of the difficulties that are encountered in the current compression mechanisms, whether those difficulties have been specifically mentioned, or will otherwise be appreciated from the discussion herein.

SUMMARY

According to the present invention there is provided a data compression apparatus and a compression method for image data as set forth in the appended claims. Other, optional, features of the invention will be discussed in the following description.

In one example, a data compression apparatus and method are provided suitable for image data, including assembling pixel values into at least one group with a positional index, setting a maximum bit plane according to a highest data value in the group, and encoding the data values sequentially along the group using iteratively reduced bit plane levels until reaching a lowest bit plane or exhausting the data values in the group, including recording the positional index at each position where the bit plane level is changed, to provide a compressed dataset.

In one example there is provided a data compression method for image data, comprising: receiving an original image comprising a plurality of pixel values; assembling the pixel values into at least one linear data group with an index; setting a maximum bit plane according to a highest value in the group; encoding one or more of the pixel values using the maximum bit plane and recording the index of the encoded pixel values; iteratively reducing the bit plane by levels and encoding further of the pixel values using the iteratively reduced bit plane levels until reaching a lowest bit plane or exhausting the pixel values in the group, including recording the index of the encoded pixel values in each level; and outputting the encoded pixel values and the recorded indexes.

In one example, the pixel values may be arranged approximately by decreasing numerical value. The arrangement may be imprecise, having one or more pixel values in the group which are not presented in strict numerical order. The pixels are suitably arranged by numerical significance within the bit plane levels required to encode the pixel values. The method may include encountering one or more pixel values higher than the current bit plane level, temporarily increasing the bit plane level to encode the encountered pixel value, and then decreasing again.

In one example, the encoding may begin at the lowest bit plane and progressively increase the bit plane level. In this example, the data values may be arranged in generally increasing numerical value.

In one example there is provided a data compression apparatus suitable for image data, comprising: an input unit arranged to receive original data comprising a plurality of data values; a data preparing unit for assembling the data values into at least one linear data group with an index; a encoding unit arranged to set a maximum bit plane according to a highest value in the group, encode one or more of the data values using the maximum bit plane and record the index of the encoded data values, and iteratively adjust the bit plane by levels and encode further of the data values using the iteratively reduced bit plane levels until reaching a lowest bit plane or exhausting the data values in the group, including recording the index of the encoded pixel values in each level; and an output unit arranged to output the encoded data.

In one example, the encoded data may be recorded onto a storage medium. The encoded data may be preserved for retrieval later, or may be transmitted to another device.

In one example there is provided a data compression method for image data, comprising: receiving original image data comprising a plurality of pixel values; assembling the pixel values into a group; providing an index for each pixel value in the group; selecting a prominent value amongst the pixel values in the group; setting a starting bit plane according to the selected prominent value amongst the pixel values in the group; encoding one or more of the pixel values using the starting bit plane and recording the index of the encoded pixel values; iteratively changing the bit plane by levels and encoding further of the pixel values using the iteratively changed bit plane levels until reaching a final bit plane or exhausting the pixel values in the group, including recording the index of the encoded pixel values in each level; and outputting the encoded pixel values and the recorded indexes as a compressed dataset.

In one example, the assembling comprises applying a data transform which arranges the pixel values from an original ordering into the group.

In one example, the method includes selecting the data transform from amongst a set of data transforms, and providing a transform indicator indicating the data transform selected from the set.

In one example, the assembling arranges the pixels into one linear data group. In one example, the assembling arranges the pixel values in the linear data group approximately by decreasing numerical value, wherein the prominent value is a highest value in the group, and the iteratively changing comprises iteratively reducing the bit plane.

In one example, the encoding comprises encoding the pixel values sequentially along the group.

In one example, the recording the index comprises recording the index at each position in the group where the bit plane level is changed.

In one example, the method includes changing the bit plane level when a next-encountered pixel value in the group is appropriate to the next bit plane level.

In one example, the method includes identifying one or more pixel values which are outside the current bit plane level, temporarily altering the bit plane level away from the current bit plane level to encode the encountered pixel value, and reverting the bit plane again to the current bit plane level, including recording an identifier that the bit plane level has been changed counter to the iterative change.

In one example, the method includes dividing the original image data into a plurality of blocks, and compressing each of the blocks separately to provide a compressed data set for each block.

In one example, the index is quantised. In one example, the method includes searching amongst a plurality of quantisation levels, selecting a quantisation level for the image data, and recording a quantisation identifier identifying the selected quantisation level.

In one example, the method includes entropy coding the encoded pixel values.

In one example, the method includes decompressing the compressed dataset.

In one example, the compressed dataset comprises the encoded pixel values as a bit string, and wherein decompressing the compressed dataset comprises: setting a starting bit plane appropriate to the compressed dataset; reading one or more of the encoded pixel values from the bit string at the starting bit plane; iteratively changing the bit plane by levels according to the recorded indexes and reading further of the encoded pixel values using the iteratively changed bit plane levels until reaching a final bit plane; decoding each of the encoded pixel values; and outputting the decoded pixel values as a decompressed dataset.

In one example, the method includes dividing the original image data into a plurality of data groups, setting the starting bit plane appropriate to each group, and encoding the pixel values in each group with the bit plane level set for that group.

In one example, the method includes recording the index to mark each group, and recording the set bit plane level of the group.

In one example, the method includes dividing the original image data into a plurality of groups, wherein the groups are arranged in a hierarchy; setting the starting bit plane according to the prominent pixel value in a topmost group; encoding the topmost group of the hierarchy using the number of bits required by the starting bit plane; traversing the hierarchy, including for each group: finding a most-prominent value in a sub-hierarchy that begins with this group; when the most-prominent value is significant at the current bit plane writing a positive indicator and then store the encoded values of this group in the number of bits required by this bit plane, or else writing a negative indicator and not traversing this sub-hierarchy any more; incrementally changing the current bit plane and repeating the traversing until the compressed dataset is completed; and outputting the compressed dataset.

In one example, the method includes performing any one or more of a colour space transformation, a scaling transformation, a frequency transformation, and a quantisation transformation to the original image data prior to compressing the image data.

In one example there is provided a data compression method for image data, comprising: receiving original image data comprising a plurality of pixel values; dividing the pixel values into a plurality of groups; setting a bit plane for each group according to a prominent value amongst the pixel values in the group; encoding one or more of the pixel values using the bit plane of the group; and outputting the encoded pixel values and the recorded indexes as a compressed dataset.

In one example, the method includes providing an index for the pixel values; and recording the index of each group.

In one example, the method includes dividing the pixel values into the plurality of groups by applying a data group transform; recording a data group transform indicator which identifies a number of the groups and a size of each group as created by the data group transform.

In one example, the method includes decompressing the compressed dataset by decoding each of the encoded pixel values according to the bit plane level of the respective group, and assembling the decoded pixel values to provide a decompressed dataset.

In one example there is provided a data compression method for image data, comprising: receiving original image data comprising a plurality of pixel values; dividing the original image data into a plurality of groups, wherein the groups are arranged in a hierarchy having one or more sub-hierarchies; setting the starting bit plane according to a most-prominent pixel value in a topmost group of the hierarchy; encoding the topmost group using the starting bit plane; traversing the hierarchy, including for each group: finding a most-prominent value in a sub-hierarchy that begins with this group; when the most-prominent value is significant at the current bit plane then writing a positive indicator and storing the encoded values of this group in the number of bits required by this bit plane, or else writing a negative indicator and not traversing this sub-hierarchy any more; incrementally changing the current bit plane and repeating the traversing until the compressed dataset is completed; and outputting the compressed dataset.

In one example, the method includes decompressing the compressed dataset by decoding each of the encoded pixel values according to the bit plane level of the respective group, and assembling the decoded pixel values to provide a decompressed dataset.

In one example there is provided a data compression apparatus suitable for image data, comprising: an input unit arranged to receive original data comprising a plurality of data values; a data preparing unit for assembling the data values into at least one group with an index; a encoding unit arranged to set a maximum bit plane according to a highest value in the group, encode one or more of the data values using the maximum bit plane and record the index of the encoded data values, and iteratively adjust the bit plane by levels and encode further of the data values using the iteratively reduced bit plane levels until reaching a lowest bit plane or exhausting the data values in the group, including recording the index of the encoded pixel values in each level; and an output unit arranged to output the encoded data as a compressed dataset.

In one example there is provided data compression system comprising the data compression apparatus discussed herein, and a data decompression apparatus linked by a network, wherein the data decompression apparatus comprises: an input unit configured to receive the compressed dataset; a decoding unit configured to decode the encoded binary values in the compressed dataset in order to restore an original bit length of respective original data values; a data restorer configured to arrange the restored data values into a desired output data arrangement; and an output unit configured to output the restored data values in the output data arrangement.

In one example, a tangible, non-transient computer-readable storage medium is provided having recorded thereon instructions which, when implemented by a computer device, cause the computer device to be arranged as set forth herein and/or which cause the computer device to perform the method as set forth herein.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION

The example embodiments will be discussed in detail in relation to compression of image data, and especially 2D image data. Generally, the term 'compression' may also include decompression of the compressed data, unless the context requires otherwise. The teachings, principles and techniques of the present invention are also applicable in many other example embodiments. For example, the discussion herein is also relevant to 3D image data and even to forms of non-image data, as will appreciated by those skilled in the art.

The example algorithm discussed below will be referred to as a 'staircase' algorithm for convenience. In the example embodiments, the algorithm is performed as an adaptive lossless compression algorithm with very low complexity and hence high speed. Also, some embodiments of the compression mechanism discussed herein are lossy and have further enhanced compression ratios.

The example algorithm uses the input data which has been split or ordered into one or more groups. Within each group, it is desired that the data items have a high probability of being ordered from largest to smallest. Transformed image data can often be arranged in such a manner without sending significant amounts of ordering data. This makes the staircase algorithm particularly suitable for image data.

Figure 1:
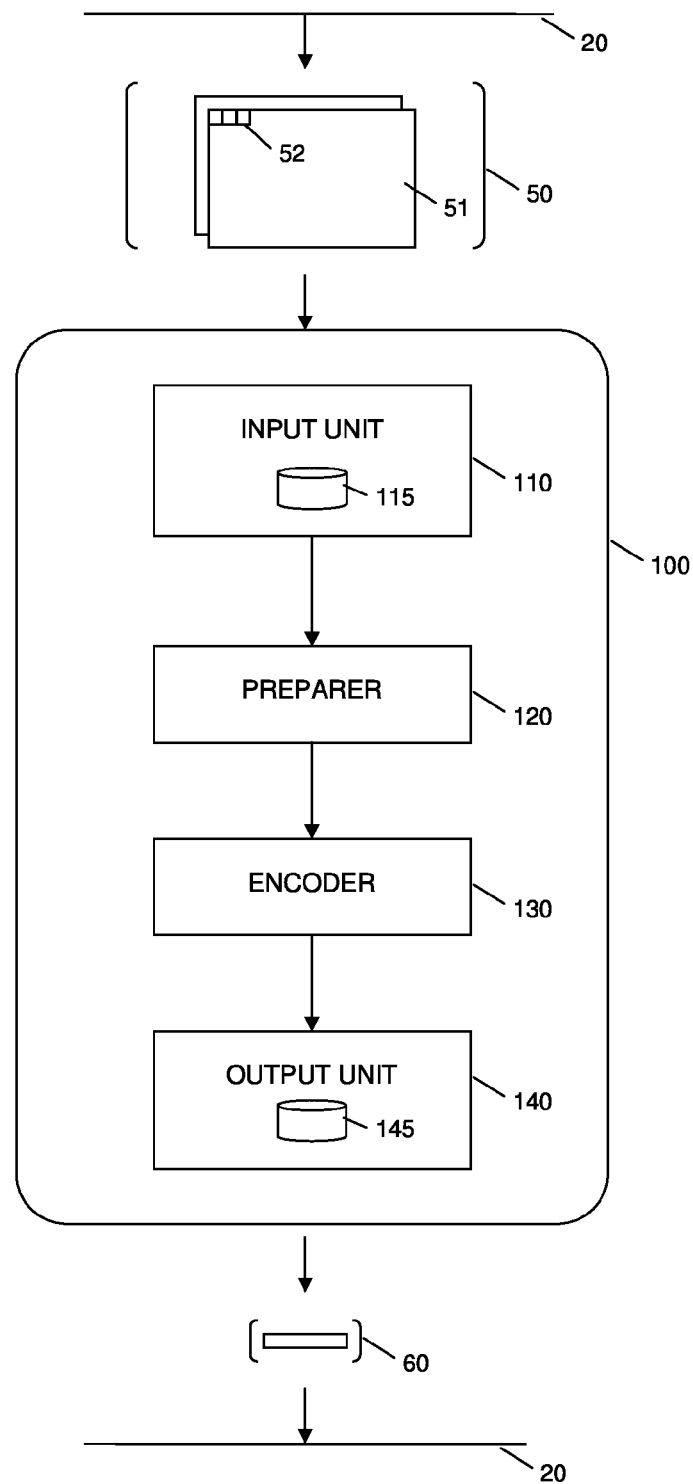
FIG. 1 is a schematic view of an example data compression apparatus.

FIG. 1 shows an example data compression apparatus 100, comprising an input unit 110, a data preparation unit 120, an encoding unit 130, and an output unit 140.

The input unit 110 is arranged to receive incoming data 50 to be compressed. In particular, the input unit 110 is arranged to receive image data 51. The image data 51 may be provided from any suitable image data source (not shown). The input unit 110 may be coupled to one or more other devices by any suitable form of communication network 20. The image data 51 may comprise two dimensional or three dimensional image data having a plurality of pixel values 52. Suitably, the input unit 110 includes a persistent, non-volatile storage unit 115 such as a hard disk drive or solid state memory which stores the received data.

The data preparation unit 120 is arranged to prepare the received data ready for encoding. In particular, the data preparation unit 120 is arranged to assemble received data values into at least one linear data group having an index. Here, the linear data group is suitably a one dimensional array. The index denotes a position of each data value within the one dimensional array. The data values and the index will be discussed in more detail below.

The encoding unit 130 encodes each of the data values in the linear data group into a binary value within a relevant bit plane. By default, the incoming data values (e.g. data values for each pixel 52) may be assumed to lie within a known data range, e.g. that the incoming values are in the range 0-255. Thus, the incoming data can be represented at least by an 8-bit binary bit plane. Meanwhile, some of the data values may not actually require all eight bits in order to be represented. For example, the decimal value 128 requires only a seven-bit bit plane ($128_{10}=2_{10}{}^{7}=10000000_2$), wherein the bit plane identifies the position of the most significant bit within the encoded binary value (in this case the seventh position). Thus, the bit plane of individual data values may be different to the bit plane of the data group. The encoding unit 130 suitably encodes each of the data values from the linear data group into a corresponding encoded binary value within a bit plane which is applied to that data value.

The output unit 140 outputs a compressed dataset 60 which suitably includes the encoded binary values together with index information which identifies transitional positions of the applied bit plane within the linear data group. The output unit 140 suitably comprises a storage medium 145, which is suitably a persistent non-volatile storage medium such as a hard disk drive or solid state memory. The output unit 140 may also be coupled to other devices by any suitable communication network 20 in order to transfer the encoded values away from the compression apparatus 100.

Figure 2:
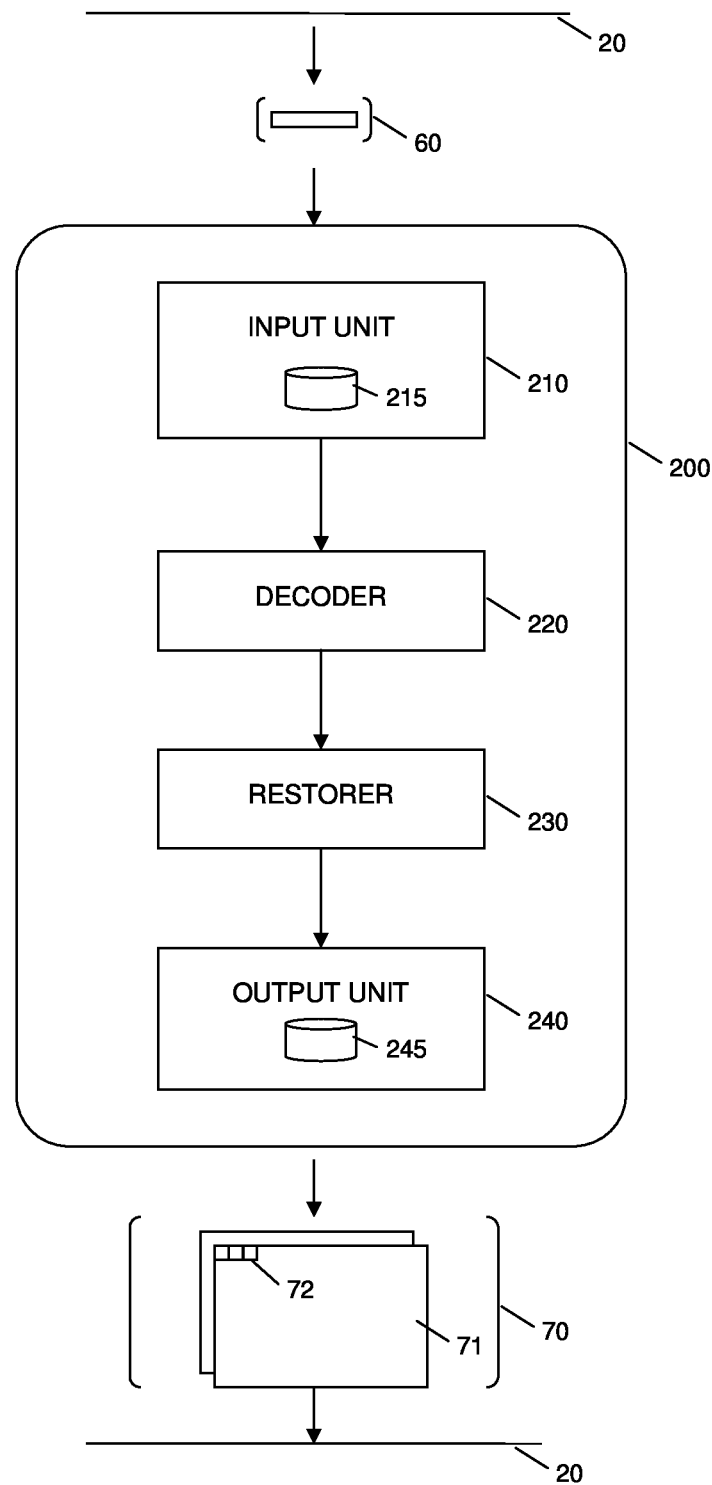
FIG. 2 is a schematic view of an example data decompression apparatus.

FIG. 2 shows an example decompression apparatus 200, comprising an input unit 210, a decoder 220, a restorer 230 and an output unit 240. The input unit 210 receives a compressed dataset 60, as may be produced by the compression apparatus 100 of FIG. 1. The decoding unit 220 is arranged to decode the encoded binary values in order to restore an original format or bit length of the respective data values. The data restorer 230 arranges the restored data values into a desired arrangement, suitably by transforming a one dimensional linear data array into a multi-dimensional array of pixel values appropriate to a 2D or 3D image. The restorer may effectively reverse transform the data, in order to reverse the transform performed by the data preparation unit 120 of the compression apparatus 100. The restorer may perform a transformation which is determined by a transform indicator sent from the compression apparatus 100. The output unit 240 outputs the restored output data 70, suitably as a restored image data 71. In one embodiment, which performs lossless encoding, the restored image data 71 will exactly match the original image data 51.

Figure 3:
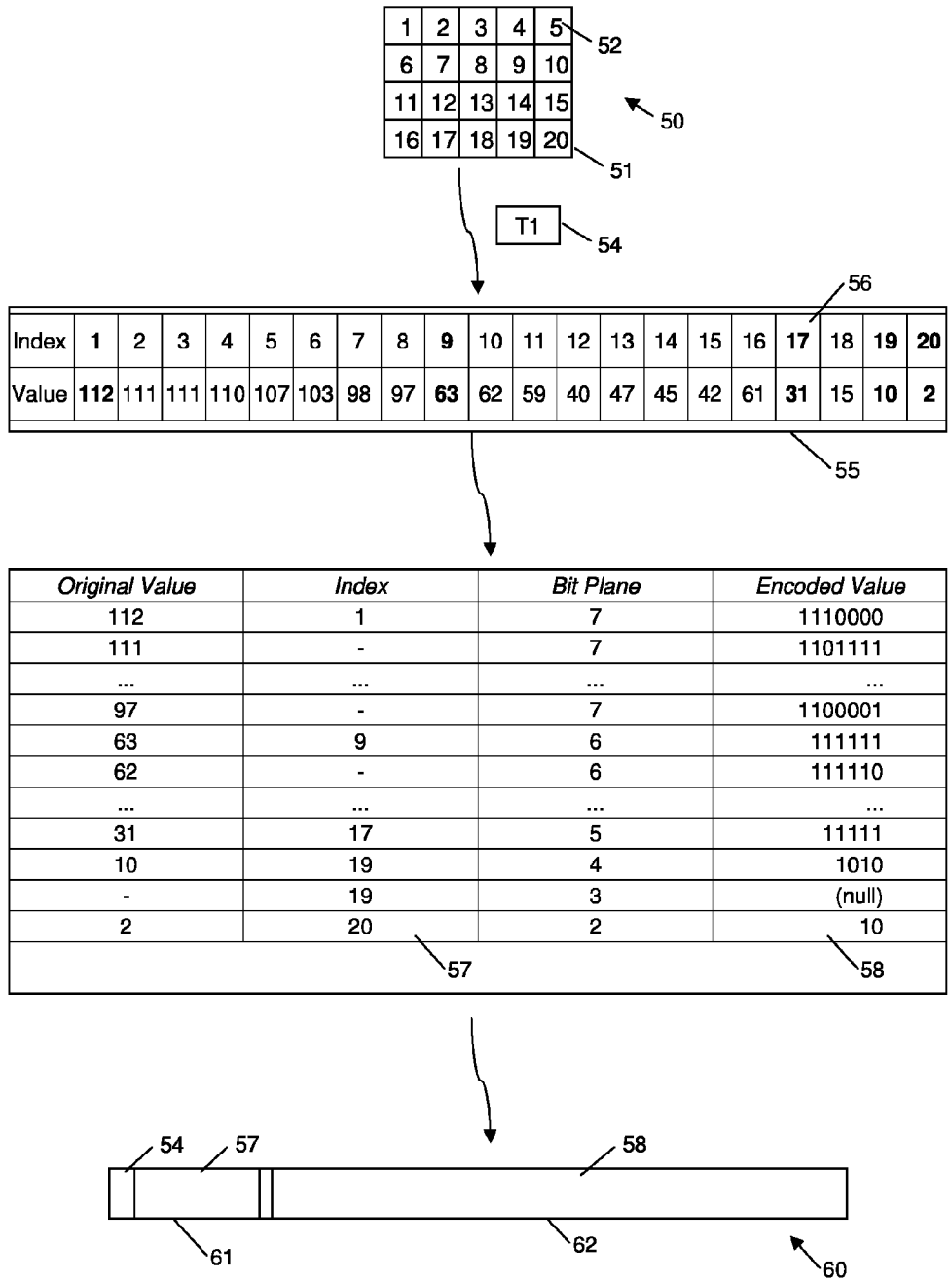
FIG. 3 is a schematic view illustrating data during compression and decompression.

FIG. 3 is a schematic diagram illustrating data during the example encoding and decoding algorithm. In particular, FIG. 3 shows original image data 51 comprising pixel data values 52 which represent a 2D image. For illustration, each pixel value 52 in the original data is an 8-bit data value (i.e. in the range 0-256). For illustration, a 5×4 image patch is shown, comprising 4 rows each of 5 pixel values. In practice, each pixel may require multiple values in separate channels such as YUV, RGB or RGBα, in which case the image data comprises 3, 4, or more channels, as appropriate. Suitably, each channel is treated separately. In another example, the image data 51 may represent a 3D image.

The original data 51 is arranged into at least one linear data group 55. Each data value 52 within the group 55 is associated with a respective index 56 which identifies the position of that data value 52 within the group. In this simple example, there are twenty data values from the original data, which are allocated the index values 1-20, respectively. In practice, the original data group may be relatively large, such as several million pixels in one image. The mechanism may divide the image into a plurality of macro blocks, and then encode each macro block separately as discussed herein.

The data preparation unit 120 of the compression apparatus 100 may rearrange the original data 51 into the at least one linear data group 55, so that the data values 52 are roughly numerically ordered (i.e. numerically similar data values are most likely arranged near to each other). It has been found that many data sets in practice are already substantially numerically ordered, or can be quickly transformed with a standard transformation into an approximately numerically ordered group. One of a set of standard transformations may be chosen and the relevant transformation (indicated as 'T1' in the drawing) can be recorded as part of the encoded data, so that an appropriate reverse transformation is performed later by the data restorer 230. A transform indicator 54 may be provided, e.g. to be placed in a header of the compressed data 60, which informs the decompression apparatus 200 of the relevant transform which has been applied by the compressor 100 to this dataset.

Linear Data

The first example case is where there is a single linear group of data. In the example embodiments, the values in this single group are arranged roughly from largest to smallest. The staircase algorithm proceeds as follows:

1: Set the bit plane to that of the largest value. For example if the largest value is 112 the bit plane will be 7.
2: Record the index of the last value for which this bit plane is significant. Continuing our example with bit plane 6 we will record the index of the last value greater than 63.
3: Store each value up to this index using the appropriate bit depth. In our example each value up to this index will be stored in 6 bits.
4: If not at bit plane 0 or the end of the set of values to code reduce the bit plane by 1 then go to 2.
5: Optionally encode the recorded indices with an entropy coder such as an Arithmetic or Huffman coder.

One illustrative example of this kind of data would be DCT coefficients which have been zigzag scanned by a method similar to jpeg scanning.

Figure 4:
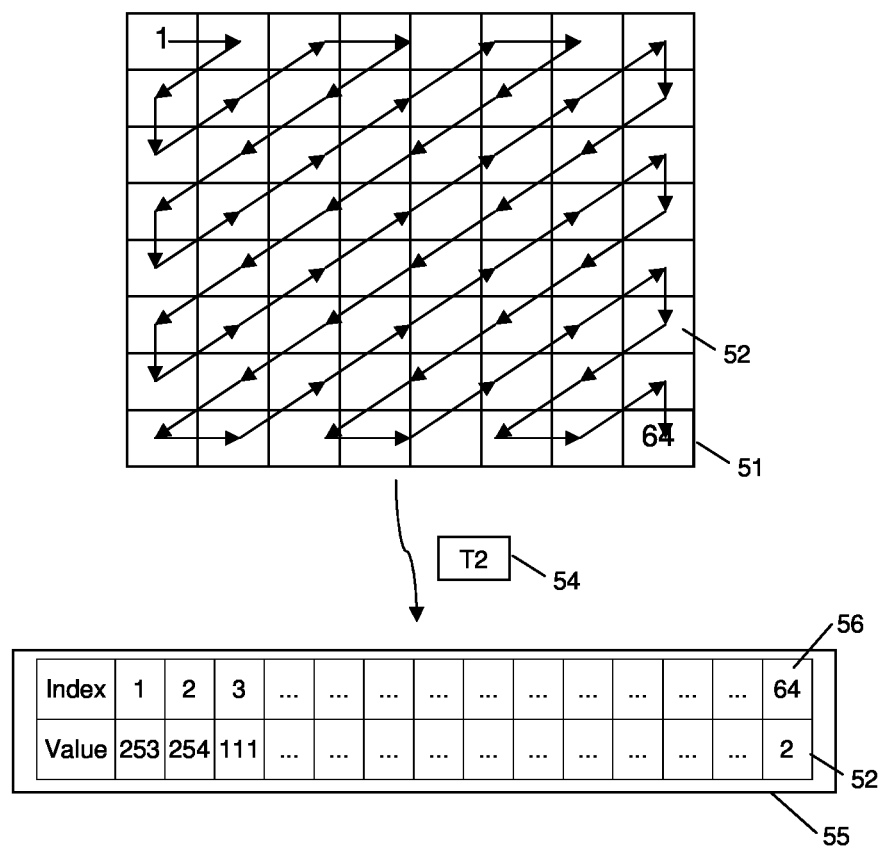
FIG. 4 is a schematic view of an example data transform.

FIG. 4 shows an example zigzag transform (indicated as 'T2' in the drawing) which may be used by the data preparation unit 120 to produce the linear data group 55. This form of zigzag ordering will be familiar to those skilled in the art of JPEG image coding applied to 64 image values in an 8×8 macro block, and in particular to 64 discreet cosine transform (DCT) coefficients. Normally, in JPEG, these DCT values are Huffman coded as a form of entropy coding. Instead, the claimed invention applies the "staircase" algorithm discussed herein as a fast, simple, and potentially lossless encoding. As shown in FIG. 4, in this example an 8×8 block of pixels 52 are transformed into a single string as a linear data group 55 using the zig-zag transform 54. Many other specific forms of transform will be familiar to the skilled person and may be incorporated into the example embodiments as appropriate for the data under consideration.

One example embodiment further comprises the step of quantising the index data. In this case, the quantised values may be rounded up. This embodiment may reduce the size of the index data, but may increase the size of the value data. That is, the index values are recorded at convenient quantisation, which may cause data values to be encoded at a bit plane level which is higher than optimum. In a large dataset of, say, about 1 million pixels, then it may be convenient to quantise the index values to the nearest convenient binary value by rounding-up the determined actual index value to a nearest quantised value. Thus, the index may be recorded at any desired level of granularity, and may have a granularity which is less than the number of data values in the group.

In the example embodiments, an optimum level of quantisation can be determined. One example mechanism is to search through the space of possible quantisation values, which may be slow but not impractically so. That is, there is a relation between the number of bits added to the overhead by the recorded index values, compared with the number of bits saved in the payload data by encoding the data values. Recording fewer index values, or recording the index values more efficiently through quantisation, may be beneficial in some embodiments.

Suitably, a list of index values is recorded, wherein the recorded index values 57 indicate the positions where the bit level has been changed (reduced). The data values 52 are encoded according to the indicated bit plane, starting from the recorded index position. Thus, the recorded indexes show the transitional positions in the linear array where the bit plane has been changed. In the example embodiments, each recorded index value indicates an iterative reduction of the bit plane to the next lower level. In one example, the mechanism searches the dataset to find appropriate points for reducing the bit plane, e.g. searching ahead for the last data value of the set which requires encoding in the current bit plane, and recording the index position of that data value.

FIG. 3 shows an example output compressed dataset 60 comprising a header region 61 and a payload region 62. The header region 61 may carry the list of index values 57 indicating the positions where the bit plane has been changed, and optionally the transform indicator 54. The payload region 62 contains each of the encoded data values 58 in turn, wherein each of the encoded data values has a length according to the currently set bit plane appropriate to the index position of that data value. Notably, a single data string may be used to carry the encoded data values.

In the corresponding decompression mechanism, the compressed string of data values is divided to obtain each of the encoded data values, based on the list of recorded index values. Looking at the example of FIG. 3, the first eight values (index positions 1-8) are each 7 bits long. The next eight values (positions 9-16) are each 6 bits. The next two (positions 17, 18) have 5 bits. The next one (position 19) has 4 bits. The index of position 19 is repeated in the list of recorded index values to show that there are zero data values at the next incremental bit plane level, which in this case is the 3-bit plane. The last data value (position 20) is encoded with 2 bits, and no data values are encoded with one bit. In this example, 160 bits of original data (20*8 bits) have been compressed into an encoded payload of 120 bits (8*7+8*6+2*5+1*4+0*3+1*2+0*1). Even better compression ratios may be achieved depending upon the size of the dataset, and the data values therein.

In one example, the list of index values may be recorded explicitly (i.e. recording the actual index position). In another example, the list of index values may be recorded relatively (i.e. indicating a delta value between the current position and the next position, e.g. "+8").

Compression ratios between 15:1 and 25:1 are achieved by the example embodiments, similar to the compression ratio achieved by JPEG. However, the compression and decompression time is much faster. Notably, only a single pass over the whole dataset is required for decoding/decompression, giving significantly reduced decoding time. In many environments, in particular considering data streaming or downloading, there is a need to quickly and efficiently decompress image data ready for display to the user. Thus, the speed advantages of the present mechanism are particularly relevant in these online environments.

For the user, the 'point of first play' is often very important, i.e. the delay between instructing a client device to reproduce the desired product (or part of a product), and the time when the product is available for control by the user. Games are a prime example of a graphics-intensive product, where most of the data to be downloaded involves images (including especially texture files for 3D graphic objects). Hence, highly compressing these image files reduces the download time, by reducing the total quantity of data to be downloaded. However, most compression mechanisms have a relatively long decompression time, especially considering that the client device may have relatively limited computing resources such as processing power, memory, etc. Therefore, the 'point of first play' can be improved by the compression mechanism discussed herein, considering the very fast decompression/decoding of the compressed/encoded data.

Clustered Data

The next example to consider is clustered data, wherein the data is split into multiple groups. Within any group the data is ordered more or less randomly but the groups themselves are ordered by size. This ordering doesn't need to be perfect but any deviation from perfect ordering will result in less optimal compression. Coding this multiple group data is similar to coding linear data. The key difference is that instead of considering individual elements, each group is worked on in turn. In this case, the significance test is carried out on the largest member of each group.

Figure 5:
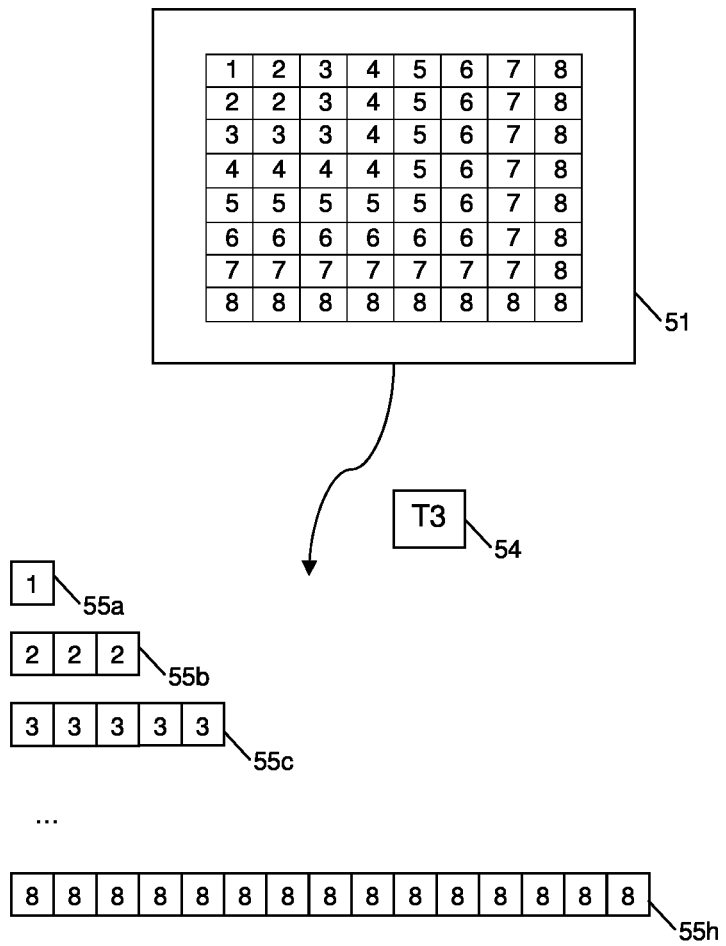
FIG. 5 is a schematic view showing a type of data transformation useful for multiple data groups.

FIG. 5 is an example of data transformation where original data 51 is transformed to provide a plurality of linear data groups 55. As shown in FIG. 5, an 8×8 block of original data 51 is divided into 8 groups 55a-55h. Each group contains a different number of data values which are drawn from the original data, as shown in FIG. 5. Group 1 contains 1 data value. Group 2 contains 3 data values. Group 3 contains 5 data values, and so on, until Group 8 which contains 17 data values, in this example. The transformation has been noted as type 'T3' and may be represented by a transform indicator 54 as discussed above.

It should be noted that this is not the optimal static grouping for this type of data. To find the optimal static grouping it would be preferable to analyse a large number of blocks from different images. In some example embodiments, this analysis process can be automated.

The linear data algorithm as described above can now be applied individually to each of the groups 55a-55h. That is, a list of recorded index values may be generated for each of the data groups in turn, recording changes to the bit plane level.

In one example, the entire data group is encoded at the lowest possible bit plane for that data group, and all data values in that group are encoded with the same bit plane. This embodiment is advantageous in reducing the overhead data, by recording only one bit plane level for each group. That is, the header portion 61 suitably includes a list of the number of groups in this data set, the size of each group, and the bit plane level used to encode each group. The transform indicator 54 may be used to indicate the number and size of each group, thus leaving only the bit plane levels to be recorded for the groups of this particular dataset.

Hierarchical Data

Figure 6:
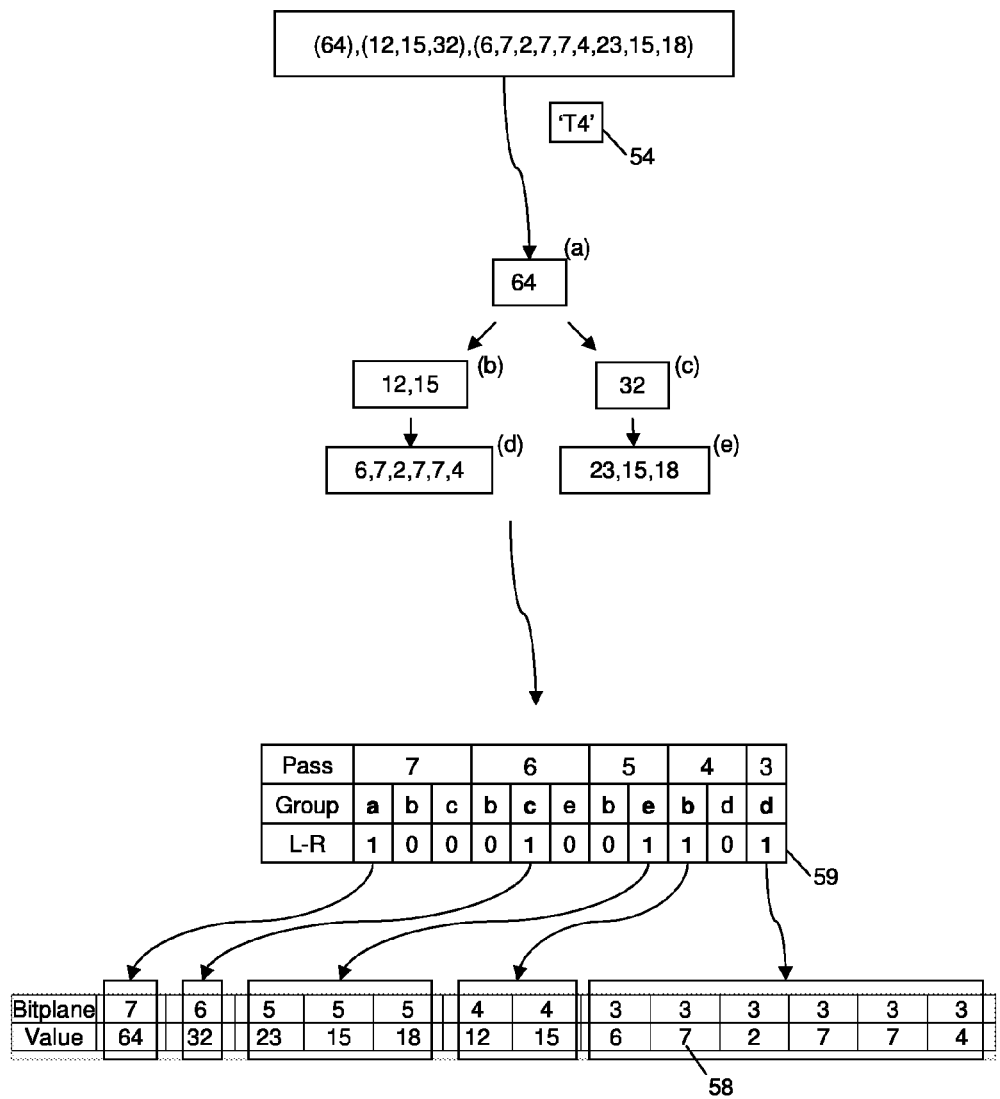
FIG. 6 is a schematic view showing a type of data transformation useful for hierarchical data.

FIG. 6 is a schematic diagram showing a type of data transformation 'T4' which is useful for hierarchical data.

Hierarchical data is provided in multiple groups similar to the clustered data above. Unlike the clustered data there are multiple sets of ordered groups. For example consider the three groups:

(64),(12,15,32),(6,7,2,7,7,4,23,15,18)

We could code these as groups, but if we allow each group to have multiple sub-groups we get the hierarchy as shown in FIG. 6. This hierarchy allows for more efficient coding as the (6,7,2,7,7,4) group will now be coded with 3 bits per value instead of the 5 bits per value required for the (23,15,18) group. The disadvantage of this approach is that it requires more significance data. In practice, the example embodiments find a balance between groups small enough to efficiently encode and few enough groups that the significance data doesn't destroy the gains in value data.

Hierarchical data is coded slightly differently than linear or clustered data. The process for hierarchical data runs as follows:
1: Set the bit plane to that of the largest value.
2: Store the top group of the hierarchy using the number of bits required by this bit plane.
3: Traverse the hierarchy. For each group:
  4: Find the largest value in the sub hierarchy that begins with this group.
  5: If this value is significant at the current bit plane write a 1 and then store the values of this group in the number of bits required by this bit plane. If not write a 0 and do not traverse this sub hierarchy any more.

6: Lower the current bit plane by one bit and repeat from 3. Ignore any groups whose values have already been stored.

As shown in FIG. 5, the resultant encoded data stream comprises the encoded data values 58 (each binary encoded at the relevant bit plane) as the payload, as described above. Meanwhile, the header further includes a traversal list comprising tree traversal flags 59 indicating whether or not the relevant group has been encoded in this pass (bit plane level). In this example, a value of '1' indicates that the respective group has been encoded. Thus, the group structure (e.g. from the transform indicator 54, or otherwise), together with the traversal list of traversal flags 59, allows the decoder to extract the relevant encoded binary values from the encoded datastream 60.

This hierarchical embodiment is more complicated that the first two approaches, and hence a worked example is now provided using the data above:

1: The bit plane is set to 7 as the largest value is 64.
2: 64 is stored as a 7 bit number.
3: Traversal begins at the group (12,15)
   4: The largest value in the sub hierarchy is 15.
   5: This value is insignificant at bit plane 7 so we code a 0 and do not traverse this tree any further.
3: Traversal moves to the group (32)
   4: The largest value in the sub hierarchy is 32.
   5: This value is insignificant at bit plane 7 so we code a 0 and do not traverse this tree any further. This is the end of the data.
6: Lower the bit plane to 6
3: Traversal begins at the group (12,15)
   4: The largest value in the sub hierarchy is 15.
   5: This value is insignificant at bit plane 6 so we code a 0 and do not traverse this tree any further.
3: Traversal moves to the group (32)
   4: The largest value in the sub hierarchy is 32.
   5: This value is significant at bit plane 6 so we code a 1 in one bit and code the only value in the group (32) with 6 bits.
3: Traversal moves to the group (23,15,18)
   4: The largest value in the sub hierarchy is 23.
   5: This value is insignificant at bit plane 6 so we code a 0 and do not traverse this tree any further. This is the end of the data.
6: Lower the bit plane to 5
3: Traversal begins at the group (12,15)
   4: The largest value in the sub hierarchy is 15.
   5: This value is insignificant at bit plane 5 so we code a 0 and do not traverse this tree any further.
3: Traversal moves to the group (23,15,18)
   4: The largest value in the sub hierarchy is 23.
   5: This value is significant at bit plane 5 so we code a 1 in one bit and code the values 23,15 and 18 with 5 bits each. This is the end of the data.
6: Lower the bit plane to 4
3: Traversal begins at the group (12,15)
   4: The largest value in the sub hierarchy is 15.
   5: This value is significant at bit plane 4 so we code a 1 in one bit followed by the values 12 and 15 in 4 bits each.
3: Traversal moves to the group (6,7,2,7,7,4)
   4: The largest value in the sub hierarchy is 7.
   5: This value is insignificant at bit plane 3 so we code a 0 and do not traverse this tree any further.
6: Lower the bit plane to 3
3: Traversal begins at the group (6,7,2,7,7,4)
   4: The largest value in the sub hierarchy is 7.
   5: This value is significant at bit plane 3 so we code a 1 in one bit followed by the values 6,7,2,7,7 and 4 in 3 bits each. This is the end of the data and all values are coded so we are done.

As an illustrative example, wavelet data is usually arranged in a hierarchical fashion. The groups are generally not optimal for coding but they will still achieve a good level of compression with the described example algorithm.

Use on Image Data

The example coding algorithms are particularly useful when applied to image data.

Figure 7:
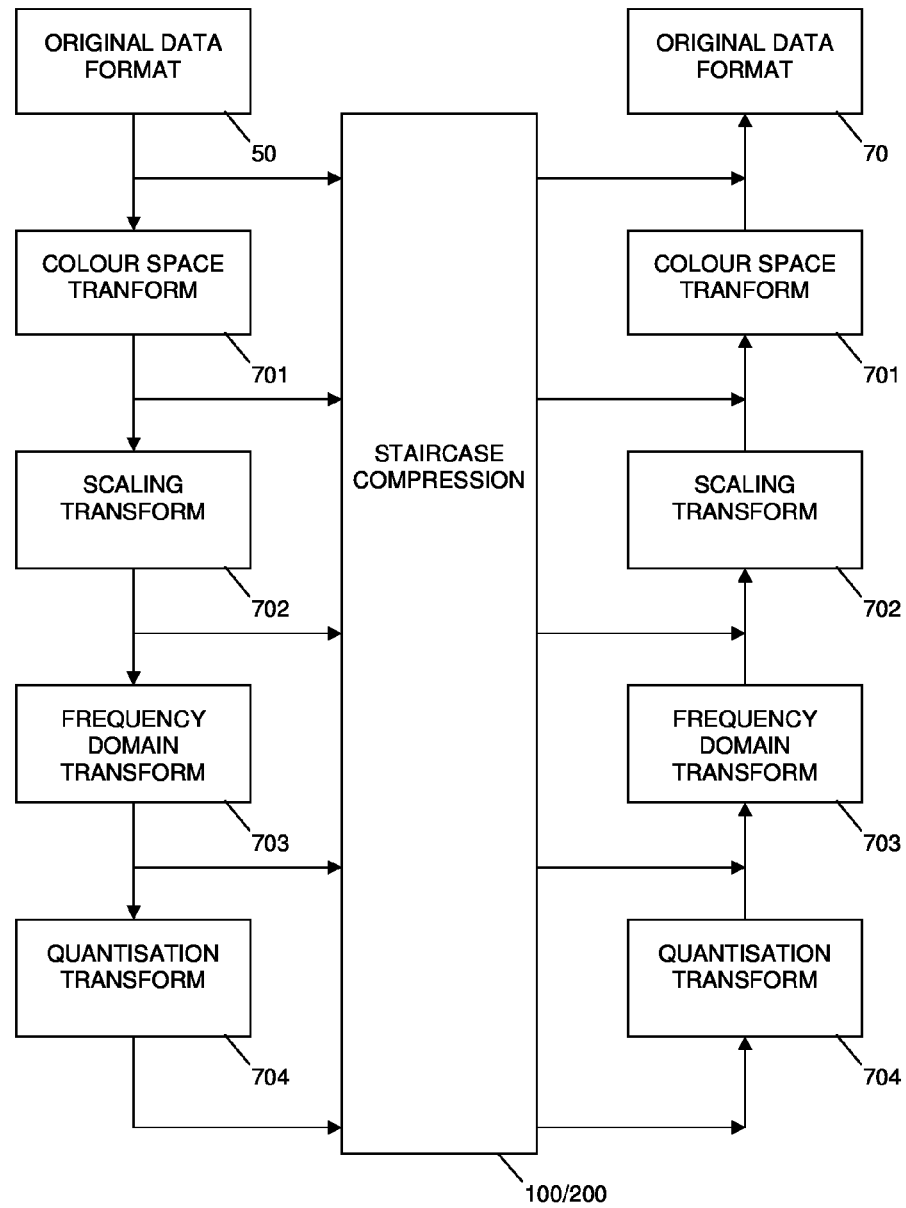
FIG. 7 is a schematic view of an example system which has multiple data manipulation stages.

FIG. 7 is a schematic diagram showing example embodiments using multiple data manipulation stages. That is, multiple stages may be combined together, including the staircase algorithm discussed herein. A lossy compression may be performed in some embodiments.

As shown in FIG. 7, these stages suitable include a colour space transformation 701, a scaling transformation 702, a frequency transformation 703, and/or a quantisation transformation 704. The transformed data from any of these stages may then be passed through the staircase compression mechanism, followed by relevant reverse transformations as appropriate to recover the restored data 70 in the original format (which may, or may not, have been losslessly encoded). Thus, the staircase algorithm is useful in both lossless and lossy encoding processes.

As one example embodiment, an original image (e.g. in RGB format) is suitably transformed into Y'CoCg space. The chroma may be subsampled, such as by using a 4:2:0 pattern or other suitable pattern. Conveniently, it has been found that the Y'CoCg space of the example embodiment produces data which is much more compressible than either RGB or Y'CrCb. The subsampling can be chosen to taste. For example, 4:4:4 subsampling may also be used. The example embodiments also support planes of alpha data. In the example embodiment, the input data is convertible through a three or four channel pixel format with 8 bits per pixel. Support for other bit depths may also be provided.

In the example embodiment, each plane is transformed using an 8×8 dct. These transformed coefficients are then zigzag scanned, which conveniently produces a list of coefficients which are highly likely to be ordered from largest to smallest. RLE coding may be used to remove runs of zeros. The run lengths, but not values, are then compressed using an arithmetic coder. The dc values from the dct are also compressed with an arithmetic compressor. The ac values are then compressed using the linear data staircase coding algorithm. The starting bit plane for each dct block is determined from that block's dc coefficient. The index values that result from the staircase coding are also arithmetic compressed.

In the example embodiment, the vast majority of the data is the staircase coded ac coefficients followed by the arithmetic compressed index values. This is not a negative comment on the staircase algorithm as there are 63 ac coefficients for every dc coefficient. Even accounting for zeros removed by run length coding there are 20-40 ac coefficients for each dc coefficient.

The arithmetic coding of dc coefficients has little effect at quality level 70 and could easily be removed, allowing the dc coefficients to be coded by the staircase algorithm. At lower quality settings the arithmetic coding becomes more significant. This is at a rate which seems to be consistent with the increase in quantisation so the gains should also apply if the dc coefficients are staircase coded instead.

Other example embodiments employ the clustered data algorithm discussed above.

In a further example embodiment, a two stage lifting transform may be used rather than the dct. This embodiment produces hierarchical data which is then capable of being coded with the hierarchical staricase method described above. This embodiment provides a more efficient transform both in the compressibility of output data and in speed, with a possible difficulty here in finding good quantisation matrices.

The example embodiments may provide other methods for grouping the coefficients intelligently.

Applying such grouping methods to the linear data comprises replacing the fixed zigzag order with an ordering calculated specifically for the image in question. This ordering is trivial to calculate and is small enough to be transmitted with the file without significant overhead.

Applying such grouping methods to the clustered data involves finding the optimal groups for the file in question rather than general images. The example embodiments advatageously are quick to calculate and small enough to be included in the file without major increase in file size.

In a further example embodiments, a different one of these orderings or groupings is selected and applied per bit plane level. This adaptive method is relatively lightweight and advantageously may provide significant compression gains.

The image coding algorithms described above may be applied in reverse in order to restore the image in a desired format. For example, using the example compression algorithm in reverse, the original RGB format image data may be restored. As noted above, a lossless restoration may be acheived in some embodiments.

Although a few preferred embodiments have been shown and described, it will be appreciated by those skilled in the art that various changes and modifications might be made without departing from the scope of the invention.

Figure 8:
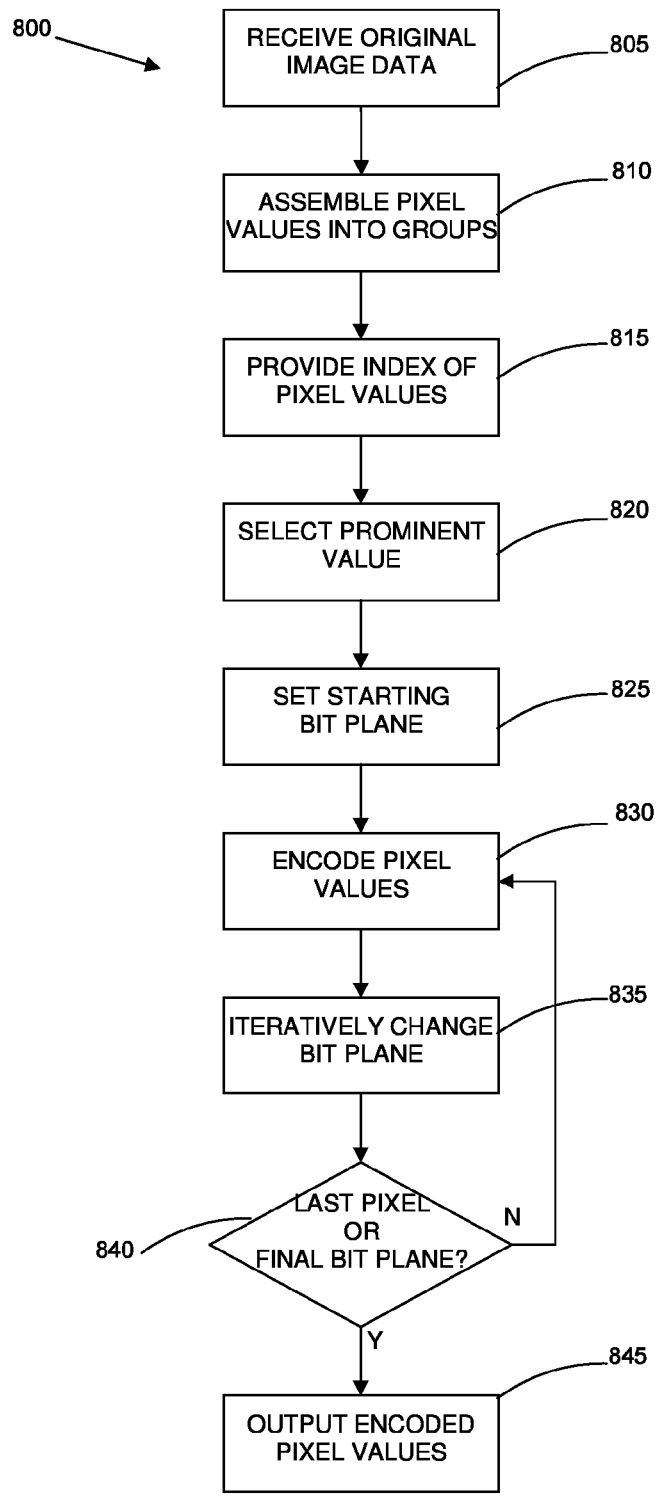
FIG. 8 is a schematic view of an example data compression method.

FIG. 8 shows an example data compression method (800) for image data. The method comprises: receiving original image data comprising a plurality of pixel values (805); assembling the pixel values into a group (810); providing an index for each of the pixel values in the group (815); selecting a prominent value amongst the pixel values in the group (820); setting a starting bit plane according to the selected prominent value amongst the pixel values in the group (825); encoding one or more of the pixel values using the starting bit plane and recording the index of the encoded pixel values (830); iteratively changing the bit plane by levels and encoding further of the pixel values using the iteratively changed bit plane levels (835) until reaching a final bit plane or exhausing the pixel values in the group, including recording the index of the encoded pixel values in each level (835, 840) and outputting the encoded pixel values and the recorded indexes as a compressed dataset (845).

I claim:

1. A data compression method for image data, the method comprising:
   receiving original image data comprising a plurality of pixel values;
   assembling the pixel values into a group;
   providing an index respectively for each of the pixel values in the group;
   selecting a prominent value amongst the pixel values in the group;
   setting a starting bit plane according to the selected prominent value amongst the pixel values in the group;
   encoding one or more of the pixel values in the group using the starting bit plane to produce one or more respective encoded pixel values and recording the index to indicate that the one or more pixel values in the group have been encoded using the starting bit plane;
   iteratively changing the bit plane by levels and encoding further of the pixel values using the iteratively changed bit plane levels to produce respective encoded bit values until reaching a final bit plane or exhausting the pixel values in the group, including recording for each level the index to indicate the pixel values in the group which have been encoded in each level; and
   outputting the encoded pixel values and the index recorded for the starting bit plane and for each level as a compressed dataset.

2. The method of claim 1, wherein the assembling comprises applying a data transform which arranges the pixel values from an original ordering into the group.

3. The method of claim 2, further comprising selecting the data transform from amongst a set of data transforms, and providing a transform indicator indicating the data transform selected from the set.

4. The method of claim 1, wherein the assembling step comprises arranging the pixel values in a linear data group approximately by decreasing numerical value wherein the prominent value is a highest value in the group, and the iteratively changing step comprises iteratively reducing the bit plane.

5. The method of claim 1, wherein the assembling step comprises arranging the pixel values in a linear data group approximately by increasing numerical value wherein the prominent value is a lowest value in the group, and the iteratively changing step comprises iteratively increasing the bit plane.

6. The method of claim 1, wherein the recording the index comprises recording the index at each position in the group where the bit plane level is changed.

7. The method of claim 1, comprising changing the bit plane level when a next-encountered pixel value in the group is appropriate to the next bit plane level.

8. The method of claim 1, further comprising:
   identifying one or more pixel values which are outside a current bit plane level,
   temporarily altering the bit plane level away from the current bit plane level to encode the encountered pixel value, and
   reverting the bit plane again to the current bit plane level, including recording an identifier that the bit plane level has been temporarily changed.

9. The method of claim 1, further comprising dividing the original image data into a plurality of blocks, and compressing each of the blocks separately to provide the compressed data set for each block.

10. The method of claim 1, wherein the compressed dataset comprises the encoded pixel values as a bit string, and wherein the method further comprises decompressing the compressed dataset by:
    setting a starting bit plane appropriate to the compressed dataset;
    reading one or more of the encoded pixel values from the bit string according to the starting bit plane;
    iteratively changing the bit plane by levels according to the recorded indexes and reading further of the encoded pixel values using the iteratively changed bit plane levels until reaching a final bit plane;
    decoding each of the encoded pixel values; and
    outputting the decoded pixel values as a decompressed dataset.

11. The method of claim 1, further comprising:
    dividing the original image data into a plurality of data groups,
    setting the starting bit plane appropriate to each group, and encoding the pixel values in each group with the bit plane level set for that group.

12. The method of claim 11, further comprising recording the index of the pixel values in each group to mark each group, and recording the set bit plane level of the group.

13. The method of claim 1, further comprising:
dividing the original image data into a plurality of groups, wherein the groups are arranged in a hierarchy;
setting the starting bit plane according to the prominent pixel value in a topmost group;
encoding the topmost group of the hierarchy using the starting bit plane;
traversing the hierarchy, including, for each group, performing the steps of:
finding a most-prominent value in a sub-hierarchy that begins with this group and setting a current bit plane according to the most-prominent value; and
when the most-prominent value is significant at the current bit plane, writing a positive indicator and then encoding the pixel values of this group in the number of bits required by the current bit plane, or else writing a negative indicator and not traversing this sub-hierarchy any more;
incrementally changing the current bit plane and repeating the traversing until each group in the hierarchy has been encoded into the compressed dataset; and
outputting the compressed dataset.

14. The method of claim 1, further comprising performing any one or more of a colour space transformation, a scaling transformation, a frequency transformation, and a quantisation transformation to the original image data after the receiving original image data comprising a plurality of pixel values and prior to assembling the pixel values into a group.

15. A data compression method for image data, comprising:
receiving original image data comprising a plurality of pixel values;
dividing the original image data into a plurality of groups, wherein the groups are arranged in a hierarchy having one or more sub-hierarchies;
setting a starting bit plane according to a most-prominent pixel value in a topmost group of the hierarchy;
encoding the topmost group using the starting bit plane;
traversing the hierarchy, including for each group:
i) finding a most-prominent value in a sub-hierarchy that begins with this group and setting a current bit plane according to the most-prominent value; and
ii) when the most-prominent value is significant at the current bit plane then writing a positive indicator and storing the encoded values of this group in a number of bits required by the current bit plane, or else writing a negative indicator and not traversing this sub-hierarchy any more;
incrementally changing the current bit plane and repeating the traversing until the compressed dataset is completed; and
outputting the compressed dataset.

16. The method of claim 15, further comprising decompressing the compressed dataset by decoding each of the encoded pixel values according to the bit plane level of the respective group, and assembling the decoded pixel values to provide a decompressed dataset.

* * * * *